United States Patent [19]

Clausen et al.

[11] 4,445,158

[45] Apr. 24, 1984

[54] CLEANING HEAD ASSEMBLY FOR A CASSETTE CLEANER

[75] Inventors: Eivind Clausen; James D. Allsop, both of Bellingham, Wash.

[73] Assignee: Allsop, Inc., Bellingham, Wash.

[21] Appl. No.: 337,772

[22] Filed: Jan. 7, 1982

[51] Int. Cl.³ ........................... G11B 5/10; G11B 5/41; A47K 7/02; A47L 1/06
[52] U.S. Cl. ................................. 360/137; 15/210 R; 360/128
[58] Field of Search ................. 360/93, 128, 132, 135, 360/137; 369/289; 15/32, 100, 210 R

[56] References Cited

U.S. PATENT DOCUMENTS

| | | | |
|---|---|---|---|
| 3,810,230 | 5/1974 | Orlowski | 360/128 |
| 3,955,214 | 5/1976 | Post | 15/210 R |
| 4,065,801 | 12/1977 | Leaming | 360/137 |
| 4,141,053 | 2/1979 | Kara | 360/137 |
| 4,272,796 | 6/1981 | Van Kreuningen | 360/137 |

*Primary Examiner*—Robert M. Kilgore
*Attorney, Agent, or Firm*—Hughes, Barnard & Cassidy

[57] ABSTRACT

A "U" shaped mounting head in which is mounted a removeable retaining device adapted to retain a cleaning pad therein. The retaining device has sidewalls that fit against side surfaces of a recess of the mounting head, and an upper and a lower oppositely extending flange on opposite side walls to engage related upper and lower surfaces of the mounting head so as to be retained securely in the recess.

13 Claims, 7 Drawing Figures

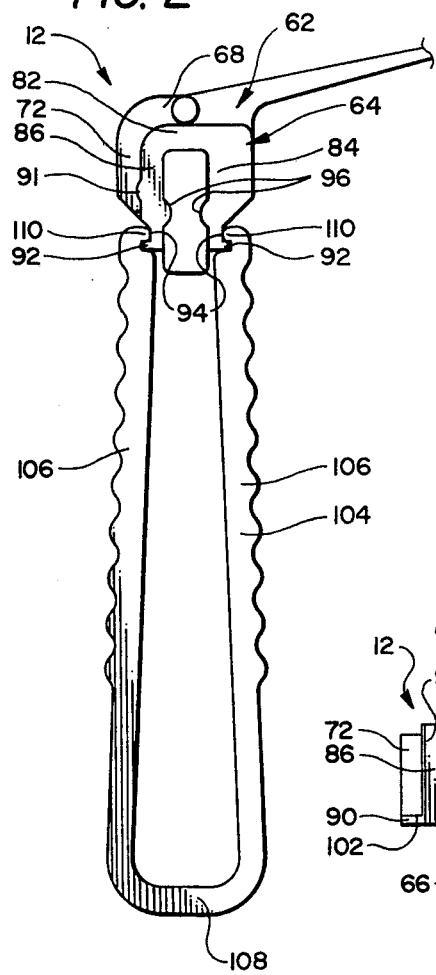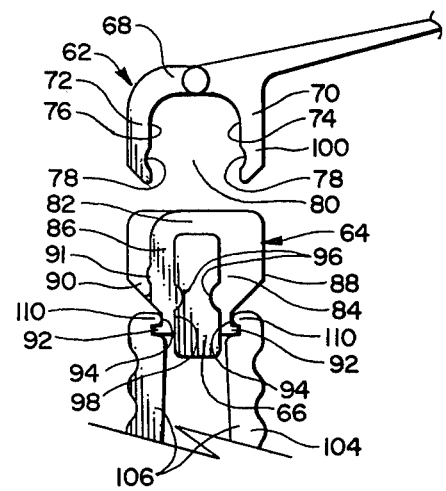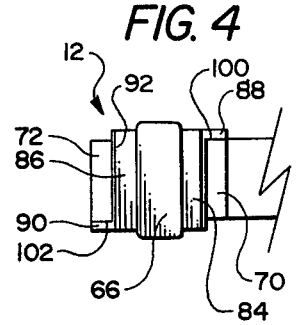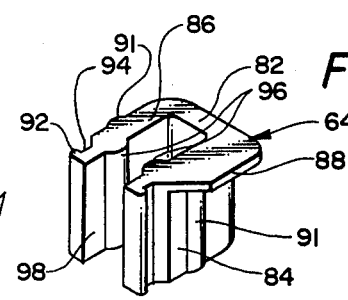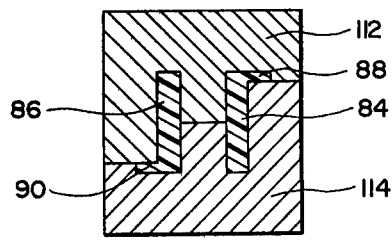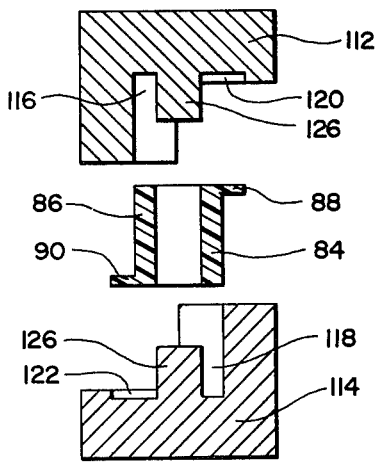

4,445,158

CLEANING HEAD ASSEMBLY FOR A CASSETTE CLEANER

BACKGROUND OF THE INVENTION

The present invention relates generally to cassette cleaners for player and/or recording units, and more particularly to a cleaning head assembly for the same.

To clean the playing/recording head of a playing-/recording unit, the prior art discloses devices which employ a cassette-like housing having a wiper arm pivotally mounted therein for reciprocating motion. At one end of the wiper arm, there is a cleaning pad which wipes back and forth against the head of the unit. It is desirable that the cleaning pad be held securely to the wiper arm, and yet it is desirable that the cleaning pad be replaced periodically after it has performed a number of cleaning operations.

Accordingly, it is an object of the present invention to provide a cleaning head assembly with a removeable retaining device for a cleaning pad, which can be securely mounted to a wiper arm so as to securely and accurately hold the pad in its cleaning position, and yet which can be conveniently removed and replaced.

SUMMARY OF THE INVENTION

The cleaning head assembly of the present invention is adapted to be mounted to a cleaning arm of a cleaning apparatus and to be placed in cleaning engagement with a component of a player and/or recording unit. The assembly comprises a mounting member adapted to be connected to the arm and comprising first and second side portions that provide a forwardly opening first recess defined by first and second side surfaces of the two side portions.

There is a retaining member having first and second side walls and a rear wall connecting the two side walls. This retaining member is adapted to fit into the first recess. The side and rear walls define a forwardly facing second recess, and the side walls are resiliently connected to the rear wall so as to be adapted to resiliently engage the side surfaces. The cleaning pad is adapted to be mounted in the second recess in a cleaning position with a forward cleaning portion of the pad extending forwardly of the second recess.

In the preferred form, there is an upper flange connected to and extending laterally outwardly from the first wall in a manner to be adapted to engage an upper edge surface of the first side portion of the mounting member. There is a lower flange connected to and extending laterally outwardly from the second side wall in a manner to be adapted to engage a lower edge surface of the second side portion of the mounting member.

In the preferred form, the mounting member and the retaining member have interengaging tongue and groove means to hold the retaining member in the first recess of the mounting member. Also, the side walls of the retaining member have inwardly facing ridge means to grip the cleaning pad in the second recess. Further, the side walls have a pair of laterally and outwardly extending lips at forward edges of the side walls to permit engagement of the side walls by a manipulating tool for insertion and removal of the retaining member.

Desirably, the retaining member is so formed that the tongue and groove means, the interior ridge means, and the interior forward lips are substantially uniform in horizontal section. Thus the retaining member can be formed by means of a two piece mold having upper and lower sections.

Also, the present invention includes the retaining member as a separate adapted to be mounted in the mounting member.

Other features of the present invention will become apparent from the following detailed description.

BRIEF DESCRIPTION OF THE DRAWING

FIG. 2 is a top plan view showing only the end cleaning portion of the wiper arm, with the cleaning head therein and a manipulating tool gripping the pad retaining device of the assembly;

FIG. 3 is a view similar to FIG. 2, but showing the retaining device removed from the mounting head of the assembly;

FIG. 4 is a front elevational view of the cleaning head assembly;

FIG. 5 is an isometric view of the pad retaining device of the assembly;

FIG. 6 is a semi-schematic view showing the general configuration of a two piece mold by which the retaining device can be made; and FIG. 7 is an exploded view showing the two part mold separated from the retaining device.

DESCRIPTION OF THE PREFERRED EMBODIMENT

Figure 1:
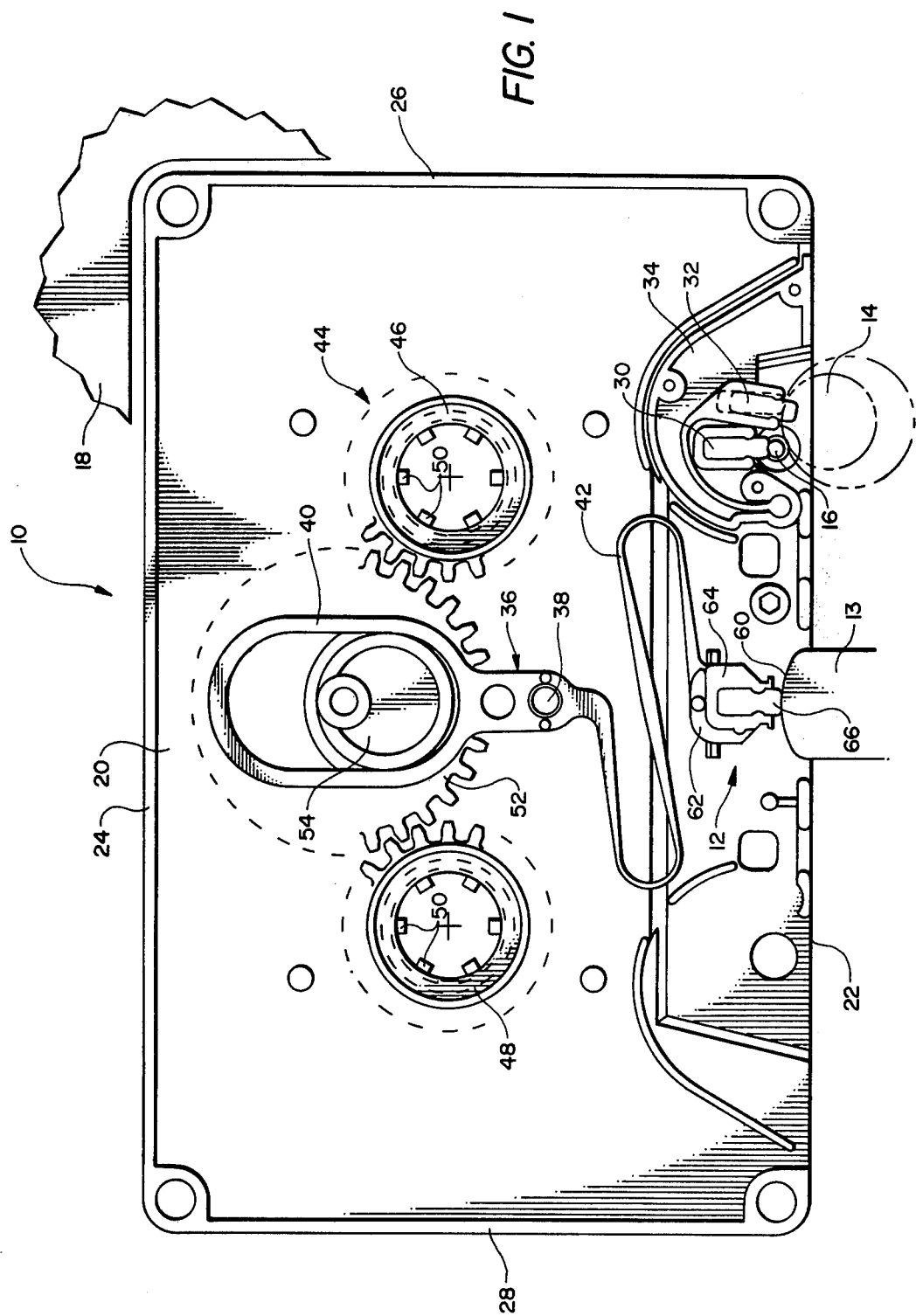
FIG. 1 is a top elevational view of a cassette cleaner adapted to utilize the cleaning head assembly of the present invention.

FIG. 1 shows a cassette cleaner 10 adapted to use the cleaning head assembly 12 of the present invention. Also shown are the playing/recording head 13, pinch roller 14 and capstan 16 of a conventional player and/or recording unit, only a portion of which is shown at 18 for ease of illustration. The cassette cleaner 10 is positioned in a recess of the unit 18, which recess normally receives a tape cassette to be used in the unit.

The cassette cleaner 10 comprises a cassette-like housing 20 having the same general configuration as a conventional cassette housing of a tape cassette. For purposes of illustration, the top cover of the housing 20 is not shown in FIG. 1. This housing 20 has a forward end 22, a rear end 24 and right and left sides 26 and 28, respectively. At the forward right hand side of the housing 20, there are a pair of cleaning pads 30 and 32 to engage the capstan 16 and pinch roller 14, respectively. These pads 30 and 32 are mounted in a suitable mounting structure 34. Since this structure 34 does not comprise part of the present invention, it will not be described in detail.

At the central portion of the housing 20, there is a wiper arm 36 pivotally mounted by a pin 38 to the housing 20. This arm 36 comprises a rear cam portion 40, an intermediate spring section 42, and the aforementioned cleaning head assembly 12 of the present invention.

To cause the arm 36 to oscillate about its pivot location 38, there is provided a drive mechanism, generally designated 44. This mechanism 44 comprises right and left gears 46 and 48 respectively, each having a hollow center and interior teeth 50 to engage a related right or left drive sprocket of the unit 18. The exterior teeth of the gears 46 and 48 mesh with a larger center gear 52 formed with an integral circular eccentrically mounted cam member 54. In operation, either the right or left gear 46 or 48 is driven by its related spindle to cause rotation of the center gear 52 with its cam 54 to cause the arm 36 to oscillate so that the cleaning head assembly 12 in turn reciprocates relative to the playing-/recording head 13 of the unit 18. The resiliency of the spring portion 42 urges the cleaning head assembly 12 against the operating surface 60 of the playing/recording head 13.

The cleaning head assembly 12 comprises a mounting head 62, a removeable retaining member 64 and a cleaning pad 66. The mounting head 62 is made as an integral part of the wiper arm 36 and i connected to the outer forward end of the spring section 42. The mounting head 62 has in top plan view a general "U" shaped configuration, and is substantially uniform with respect to horizontal sections taken through the mounting head 62. It comprises a rear wall 68 and right and left side walls 70 and 72, respectively. The interior facing surfaces 74 and 76 of the right and left walls 70 and 72 are generally vertically aligned and parallel to one another, and are formed with opposed shallow vertical grooves 78. The three walls 68, 70 and 72 collectively form a channel or recess 80 to receive the retaining member 64.

The retaining member 64 also has a generally "U" shaped configuration, and comprises a rear wall 82 a right wall 84 and a left wall 86. A first upper retaining flange 88 extends laterally from the upper edge of the right wall 84, and a second lower retaining flange 90 extends laterally from a lower edge of the left wall 86. The right and left walls 84 and 86 are each formed with a vertical shallow ridge member 91 which fits into related grooves 78 of the mounting head 62 when the retaining member 64 is mounted in the head 62.

The forward end portions of the right and left walls 82 and 84 are each formed with outwardly extending vertically aligned lips 92, and behind each lip 92 is a related gripping slot 94. The interior surfaces of the right and left walls 84 and 86 are formed at a location just forward of the center line of these walls with opposed vertically aligned ridge members 96. The side walls 84 and 86 and the rear wall 82 collectively form a receiving slot 98 to receive the cleaning pad 66.

The cleaning pad 66 is made of an absorbent material to receive a liquid cleaning solution that is applied to the pad 66. The pad 66 had a general configuration of a rectangular prism, and is sized to fit snuggly in the slot 98. The two ridges 96 of the retaining member 64 hold the pad 66 securely in the recess 98. The forward end of the pad 66 extends moderately beyond the forward lips 92 so as to be able to come into cleaning engagement with the surface 60 of the playing/recording head 13.

The pad is normally installed in the retaining member 64 as part of the initial assembly of these components, and the retaining member 64 and cleaning pad 66 are provided as a single unit which can be installed in or removed from the mounting head 62 as a replaceable unit. In the installed position, the right and left walls 84 and 86 of the retaining member 64 fit against the inwardly facing surfaces of the right and left walls 70 and 72 of the mounting head 62, with the two ridges 91 fitting in the matching grooves 78. The right upper flange 88 fits over the top surface 100 of the right wall 70 of the mounting head 62, while the lower left flange 90 fits against the lower edge surface 102 of the left wall 72 of the mounting head 62. Thus, the retaining member 64 and its pad 66 are held securely in the mounting head 62.

To remove the retaining member 64 from the mounting head 62, there is provided a simple gripping tool 104, having a pair of arms 106 resiliently connected at the rear ends by a base member 108. The outer ends of the two arms 106 have a pair of inwardly facing lips 110 which are sized to fit into the gripping slots 94 of the retaining member 64. By engaging the lips 110 with the slots 64 and pressing the arms 106 inwardly, the two side walls 84 and 86 of the retaining member 64 are moved inwardly to disengage the ridges 91 from the groove 78 to permit removal of the retaining member 64 in a forward direction from the mounting head 62.

To install the retaining member 64 and pad 66 into the mounting head 62, substantially the reverse process is followed. That is, the tool 104 used to grip the side walls 84 and 86 by inserting the lips 110 into the gripping slots 94 and squeeze the walls 84 and 86 inwardly. Then the retaining member 64 and pad 66 is moved into the recess 80, and released by the tool 104 to permit the ridges 91 to come into gripping engagement in the grooves 78.

It can readily be seen that the mounting heads 62 and the retaining member 64 can be manufactured within reasonably close tolerances so that the retaining member is positioned in a rather precisely controlled location. Since the pad 66 and the retaining member 64 are preassembled as part of the initial assembly of these components, the pad 66 can likewise be located rather precisely in the retaining member 64. Thus, the overall head assembly 12 is arranged not only to hold the pad 66 firmly in its cleaning position, but also to accurately position the pad 66 in the wiper arm 36. It will be noted that the retaining device 64 can be inverted and still be inserted in the mounting head 62. This lessens the possibility of it being improperly inserted Another very desirable feature of the present invention is that the retaining member 64 lends itself to being made by a relatively simple molding technique, which will be explained with reference to FIGS. 6 and 7. In FIGS. 6 and 7, there are shown upper and lower mold sections 112 and 114. The upper mold section 112 has a vertical slot 116 to form the left wall 86, while the lower mold section 114 has a similar slot 118 to form the right wall 84. In like manner, the upper and lower mold sections 112 and 114 are formed at the right and left sides respectively with shallow slots 120 and 122 to form the flange sections 88 and 90, respectively. The center cavity of the retaining member 64 is formed easily by center protruding portions 126 of the mold section 112 and 114. The rear wall 82 is formed quite easily by making a vertical planar cavity in either or both of the mold sections 112 or 114.

It is readily apparent from an examination of FIG. 7 that after the retaining member 64 is formed, the mold can quite easily be separated by moving the two mold sections 112 and 114 vertically from one another. Further, the two mold sections 112 and 114 can be made identical to one another.

It is to be understood that modifications can be made to the present invention without departing from the basic teachings thereof.

We claim:

1. A cleaning head assembly adapted to be mounted to a cleaning arm of a cleaning apparatus and to be placed in cleaning engagement with a component of a player and/or recording unit, set assembly comprising:
   (a) a mounting member adapted to be connected to said arm and comprising first and second side portions providing a forwardly opening first recess defined by first and second side surfaces of said two side portions, (b) a retaining member having first and second side walls and a rear wall connecting said two side walls and adapted to fit into said first recess, said side and rear walls defining a forwardly facing second recess, said side walls being resiliently connected to said rear wall so as to be adapted to resiliently engage said side surfaces, (c) a cleaning pad adapted to be mounted in said second recess in a cleaning position with a forward cleaning portion of said pad extending forwardly of said second recess.

2. The assembly as recited in claim 1, wherein, there is an upper flange connected to and extending laterally outwardly from said first side wall and adapted to engage an upper edge surface of said first side portion, and a lower flange connected to and extending laterally outwardly from said second side wall and adapted to engage a lower edge surface of said second side portion.

3. The assembly as recited in claim 1, wherein said mounting member and said retaining member have interengaging tongue and groove means to hold said retaining member in the first recess of the mounting member.

4. The assembly as recited in claim 1, wherein the side walls of the retaining member have inwardly facing ridge means to grip the cleaning pad in the second recess.

5. The assembly as recited in claim 1, wherein said side walls have a pair of laterally and outwardly extending lips at forward edges of the walls to permit engagement of said side walls by a manipulating tool or insertion and removal of said retaining member.

6. The apparatus as recited in claim 1, wherein:

(a) there is an upper flange connected to and extending laterally outwardly from said first side wall and adapted to engage an upper edge surface of said first side portion, and a lower flange connected to and extending laterally outwardly from said second side wall and adapted to engage a lower edge surface of said second side portion, (b) said mounting member and said retaining member have interengaging tongue and groove means to hold said retaining member in the first recess of the mounting member, (c) the side walls of the retaining member have inwardly facing ridge means to grip the cleaning pad in the second recess, (d) said side walls have a pair of laterally and outwardly extending lips at forward edges of the side wall to permit engagement of said side walls by a manipulating tool for insertion and removal of said retaining member.

7. The apparatus as recited in claim 6, wherein said retaining member is formed with the tongue and groove means, the interior ridge means, and the interior forward lips substantially uniform in horizontal section, whereby said retaining member can be formed by means of a two-piece mold having upper and lower sections.

8. A retaining member adapted to be removably mounted in a mounting member of a cleaning head assembly which is adapted to be mounted to a cleaning arm of a cleaning apparatus and to be placed in cleaning engagement with a component of a player and/or recording unit, with said mounting member comprising first and second side portions providing a first recess defined by first and second side surfaces of said two side portions, said retaining member comprising:

(a) first and second side walls and a rear wall connecting two side walls, said side and rear walls defining a second forwardly facing recess, said walls being resiliently connected to said rear wall so as to be adapted to resiliently engage the side surfaces of the mounting member so that the retaining member can be removably mounted in the first recess of the mounting member, (b) a first upper flange connected to and extending outwardly laterally from an upper edge of said first wall and adapted to engage an upper edge surface of said first side portion, (c) a lower flange connected to and extending laterally from a lower edge portion of said second wall and adapted to engage a lower edge surface of said second side portion.

9. The retaining member as recited in claim 8, wherein said two side walls are provided with tongue and groove means adapted to engage matching tongue and groove means of the mounting member.

10. The retaining member as recited in claim 8, wherein the side walls of the retaining member have inwardly facing ridge means to grip the cleaning pad in the second recess.

11. The retaining member as recited in claim 8, wherein said side walls have a pair of laterally and outwardly extending lips at forward edges of the side wall to permit engagement of said side walls by a manipulating tool for insertion and removal of said retaining member.

12. The retaining member as recited in claim 8, wherein:

(a) said two side walls are provided with tongue and groove means adapted to engage matching tongue and groove means of the mounting member, (b) the side walls of the retaining member have inwardly facing ridge means to grip the cleaning pad in the second recess, (c) said side walls have a pair of laterally and outwardly extending lips at forward edges of the side wall to permit engagement of said side walls by a manipulating tool for insertion and removal of said retaining member.

13. Th retaining member as recited in claim 12, wherein said retaining member is formed with the tongue and groove means, the interior ridge means, and the interior forward lips substantially uniform in vertical section, whereby said retaining member can be formed by means of a two-piece mold having upper and lower sections.

* * * * *

UNITED STATES PATENT AND TRADEMARK OFFICE
CERTIFICATE OF CORRECTION

PATENT NO. : 4,445,158
DATED : April 24, 1984
INVENTOR(S) : Eivind Clausen and James D. Allsop It is certified that error appears in the above—identified patent and that said Letters Patent is hereby corrected as shown below:

Column 4, line 13, after "104" insert --is--.

Column 4, line 32, after "inserted" inter --.--

In the claims:

Column 5, line 31, after "the" insert --side--

Column 6, line 12, after "said" insert --side--

Column 6, line 53, "Th" should read --The--

Signed and Sealed this

Eighth Day of September, 1992

*Attest:*

DOUGLAS B. COMER

*Attesting Officer*      *Acting Commissioner of Patents and Trademarks*